United States Patent [19]
Iwaki et al.

[11] Patent Number: 5,175,775
[45] Date of Patent: Dec. 29, 1992

[54] OPTICAL PATTERN RECOGNITION USING MULTIPLE REFERENCE IMAGES

[75] Inventors: Tadao Iwaki; Yasuyuki Mitsuoka, both of Tokyo, Japan

[73] Assignee: Seiko Instruments Inc., Japan

[21] Appl. No.: 734,275

[22] Filed: Jul. 22, 1991

[30] Foreign Application Priority Data

Jul. 27, 1990 [JP] Japan .................................. 2-199957

[51] Int. Cl.$^5$ .............................................. G06K 9/76
[52] U.S. Cl. ........................................ 382/31; 382/43; 359/561; 364/822
[58] Field of Search ....................... 382/31, 43, 37, 42; 250/550; 359/561, 559; 364/822

[56] References Cited

U.S. PATENT DOCUMENTS

| | | | |
|---|---|---|---|
| 3,851,308 | 11/1974 | Kawasaki et al. | 382/31 |
| 4,637,056 | 1/1987 | Sherman et al. | 382/31 |
| 4,695,973 | 9/1987 | Yu | 359/561 |
| 4,845,766 | 7/1989 | Peppers et al. | 382/31 |
| 5,040,140 | 8/1991 | Horner | 382/42 |

Primary Examiner—Michael Razavi
Assistant Examiner—Steven P. Klocinski
Attorney, Agent, or Firm—Bruce L. Adams; Van C. Wilks

[57] ABSTRACT

An optical pattern recognition method which can be applied to a joint transform correlator operative to effect correlation processing between a plurality of reference images and at least a single object image to produce correlation peaks corresponding to the respective reference images. The joint transform correlator is provided with a feedback system effective to regulate the intensity of the respective reference images according to the corresponding correlation peak value so as to noise-shape the correlation peaks to discriminate most-correlated reference images. The pattern recognition method is carried out in the correlator sequentially by first preparing a plurality of initial groups each containing a given number of individual reference images and carrying out the pattern recognition of the object image with respect to each of the initial groups to discriminate each of the most-associated reference images having a maximum correlation coefficient in each initial group. Next, the discriminated most-associated reference images are regrouped into new groups, the number of groups is less than that of the initial groups, and the pattern recognition of the object image with respect to the new groups is again carried out so as to enable next regrouping. Then, the regrouping is repeatedly carried out so as to reduce the number of the groups to thereby form a final group and carrying out the pattern recognition of the object image using the final group of reference images to thereby determine a particular reference image corresponding to the object image.

8 Claims, 7 Drawing Sheets

FIG. 5 PRIOR ART
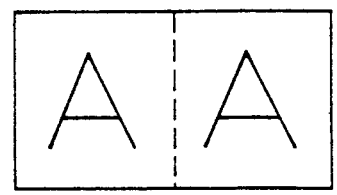
OBJECT IMAGE     REFERENCE IMAGE
FIG. 6 PRIOR ART
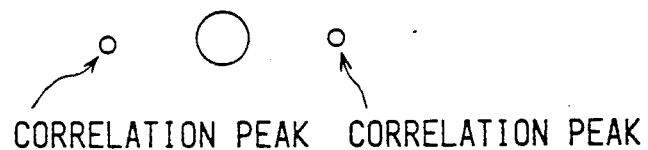
CORRELATION PEAK    CORRELATION PEAK
FIG. 7
```
     MW
   R     Y
 E         K
O     E
             G
  H       U
   B  A  J
```

OPTICAL PATTERN RECOGNITION USING MULTIPLE REFERENCE IMAGES

BACKGROUND OF THE INVENTION

The present invention relates to the method of automatically carrying out pattern recognition or pattern measurement, in the field of optical information processing and optical measurement, by applying optical correlation processing using coherent light to various two-dimensional images produced from an imaging device such as a CCD camera.

A joint transform correlator is generally used in the conventional optical pattern recognition apparatus and the conventional correlation processing apparatus. For example, FIG. 4 shows a conventional construction using an optically writeable spatial modulator. In this example, an input device 63 produces a composite input image composed of a reference image. for use as a recognition reference and an object image disposed adjacently to the reference image for correlative comparison. A laser source 50 emits a laser beam which is expanded by a beam expander 51, and which is thereafter divided by a beam splitter 52 into two beam components. One beam component passing the beam splitter 52 irradiates the input device 63 to convert the composite input image into a coherent image. This coherent image is converted by a first Fourier transform lens 29 into a joint Fourier-transformed image of the reference image and object image, which is recorded in the form of an optical density distribution on an optically writeable liquid crystal light valve 55 disposed on a Fourier image plane of the lens 29.

The other beam component reflected by the beam splitter 52 is sequentially reflected by mirrors 58, 59 and a polarization beam splitter 56 to thereby irradiate the light valve 55 rearward to reproduce the recorded optical density distribution of the joint Fourier-transformed image in the form of a coherent image. This coherent image passes through the polarization beam splitter 56, which functions as an analyzer, to form a corresponding negative or positive image. This image is again Fourier-transformed by a second Fourier transform lens 34, and is then received by a CCD camera 57 disposed on a Fourier image plane of the lens 34. By such construction, there is obtained a correlation peak which indicates a two-dimensional correlation coefficient of the object image and the reference image. A spot position of the correlation peak is uniquely determined according to a relative positional relation between the reference image and the object image around the optical axis of the system.

The above noted construction utilizes an optically writeable liquid crystal light valve of the reflection type as a spatial modulator or image recorder. Otherwise, there can be used an image recorder of the transmission type such as a BSO crystal (BiSiO) modulator. Further, in place of the optically writeable spatial modulator, a joint Fourier-transformed image is once detected by a CCD camera, and then is displayed on an electrically writeable spatial modulator such as a television monitor.

FIG. 5 shows an example of a composite input image composed of adjacent object and reference images. FIG. 6 shows a correlation peak pair indicative of a two-dimensional correlation coefficient between the reference and object images. However, in such system, it would be difficult to improve the correlation processing by concurrently effecting correlation processing between a single object image and a plurality of reference images which are a data base for correlation analysis, because of various reasons such as degradation of S/N ratio.

In order to solve the above noted difficulty, the inventors have proposed a joint transform correlator having a feedback loop, which is disclosed in Japanese Patent Application Nos. 167758/1989, 155224/1989, 247612/1989, 5241/1990 and 5246/1990, and corresponding U.S. application Ser. No. 539725. In this feedback system, at the first step, a composite input image is formed of a single object image and a plurality of reference images. The composite input image is subjected to the correlation processing to produce correlation peaks which indicate respective two-dimensional correlation coefficients between the object image and the respective one of the reference images. The optical intensity of the respective correlation peaks are measured individually. At the second step, respective intensity values of the peaks are normalized by a maximum intensity value of the strongest peak. At the third step, a beam component passing through each reference image is regulated in linear or nonlinear relation to a corresponding normalized value through a masking spatial modulator which is disposed forward or rearward of the reference images and which is driven gradatively according to the normalized values. By such operation, the correlation coefficient values are feedback to regulate intensity of the beam components passing the respective reference images, and this feedback operation is repeatedly carried out to discriminate the most significant correlation peak.

However, in the above described joint transform correlator of the feedback type, pattern recognition operation can be applied only to a limited number of reference images at one time. For example, if the reference images are alphabet characters, a maximum of thirteen characters can be concurrently processed. If more than that number of characters were processed concurrently, erroneous recognition may result. Further, it would be practically difficult to use a greater number of reference images, because the composite image input device has a limited display area. Alternatively, a composite image input device having an enlarged display area might be utilized to increase a number of reference images to be inputted concurrently. However, such modification causes a scale-up of the overall construction of the optical system and increase in cost. Further, the size of an individual reference image might be reduced for efficient use of the display area. However, in such case, a reduced reference image cannot be electrically inputted by a typical spatial modulator. Instead, noneraseable input means, such as photographic film, is adopted to treat a reduced reference image, thereby limiting a total number of reference images. Therefore the prior attempt at a feedback type joint transform correlator has the drawback that efficient pattern recognition is not effected among a great number of images such as characters.

SUMMARY OF THE INVENTION

An object of the present invention is to overcome the noted drawbacks of the prior attempts and to provide a new processing method effective to improve the image recognition capacity of the feedback type joint transform correlator.

The inventive method is applied generally to an optical pattern recognition apparatus which is comprised of means for converting a composite input image composed of a group of reference images and at least one object image into a composite coherent image. Means are provided for Fourier-transforming the composite coherent image to produce a joint Fourier-transformed image of the reference images and the object image. Means are provided including an optical spatial modulator, for recording an optical intensity distribution of the joint Fourier-transformed image on the optical spatial modulator. Means are also provided for reading the recorded optical intensity distribution with a coherent light to reproduce a corresponding coherent image. Means are also provided for Fourier-transforming the reproduced coherent image to produce a correlation image. Means including a photodetector for detecting the correlation image, are provided to produce a corresponding electric correlation signal. Means are also provided for processing the correlation signal to determine two-dimensional correlation coefficients between the object image and the respective one of the reference images, and means, including a regulating spatial modulator disposed in an optical path extending through the reference images, are provided for regulating the brightness of the respective reference images according to the corresponding correlation coefficients so as to discriminate a most-associated reference image relative to the object image to thereby effect pattern recognition of the object reference.

The inventive optical pattern recognition method is applied to the above described system, and comprises a first step of preparing a plurality of initial groups each containing a given number of individual reference images and carrying out the pattern recognition of the object image with respect to each of the initial groups to discriminate each of the most-associated reference images having a maximum correlation coefficient in each initial group. A second step of the method includes regrouping all of the discriminated most-associated reference images into new groups a number of which is less than that of the initial groups and again carrying out the pattern recognition of the object image with respect to the new groups so as to enable next regrouping, and a third step of the method includes repeatedly carrying out the regrouping so as to reduce a number of the groups to thereby form a final group and carrying out the pattern recognition of the object image using the final group of the reference images to thereby determine a particular reference image corresponding to the object image.

According to the above described pattern recognition method, an object image can be tested with respect to a vast number of reference images which exceed a limited number of reference images treated concurrently at one correlation operation of the feedback mode. Namely, the given vast number of reference images are grouped into initial groups each containing a limited number of the individual reference images in the first step. Then a most-associated reference image having a maximum correlation coefficient is discriminated for each of the initial groups. Next in the second step, all of the thus obtained most-associated reference images are regrouped into new groups each having similarly a limited number of reference images. The number of new groups is accordingly smaller than that of the initial groups. The new groups are again subjected to the correlation operation to enable next regrouping. Lastly, in the third step, the number of groups is reduced to a single final group which contains less than the limited number of the reference images. The final group is subjected to the correlation operation with respect to the object image to thereby discriminate a particular reference image exactly corresponding to the object image among the vast number of individual reference images.

BRIEF DESCRIPTION OF THE DRAWINGS

FIG. 5 is a diagram showing an example of a composite input image used in the conventional joint transform correlator;

FIG. 6 is a diagram showing a correlation peak pair obtained by the conventional joint transform correlator;

FIG. 7 is a diagram showing an example of a composite input image treated according to the inventive method;

DETAILED DESCRIPTION OF THE INVENTION

Figure 1:
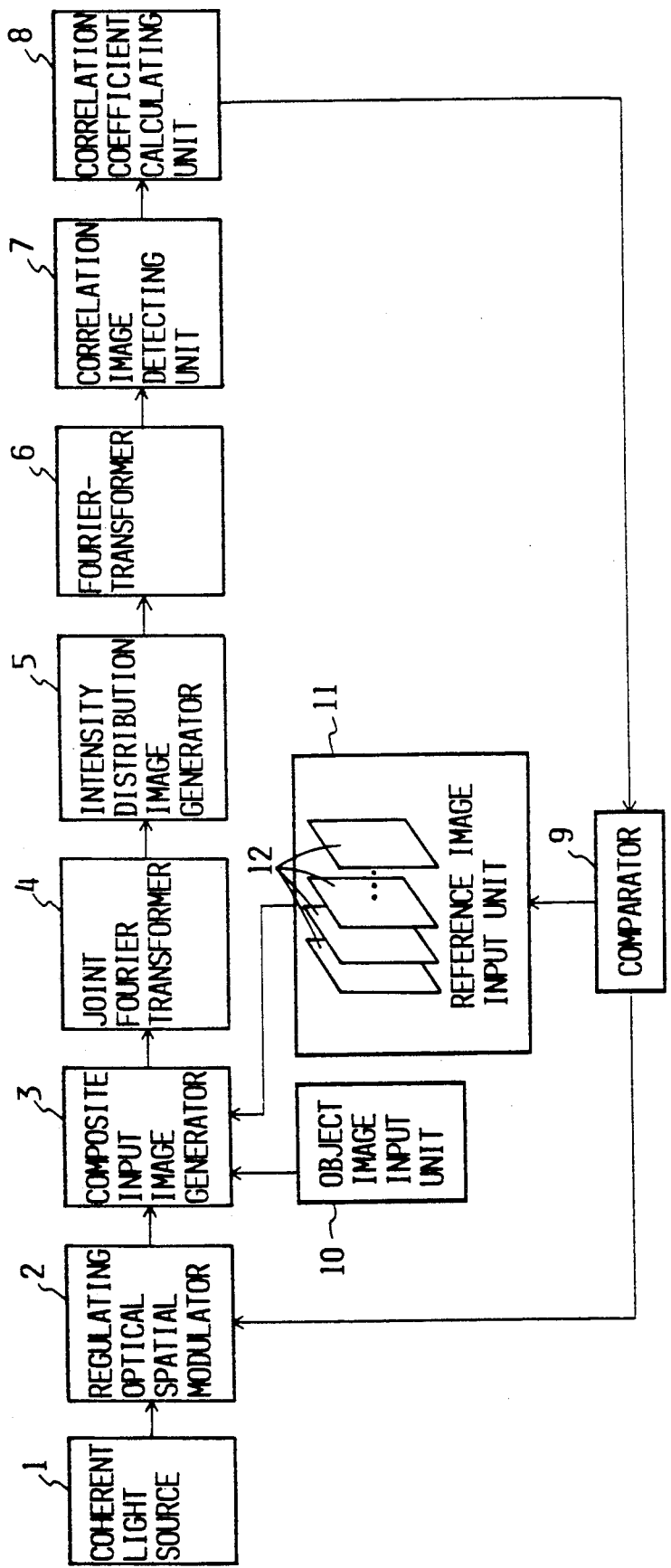
FIG. 1 is a block diagram showing a basic construction of the optical pattern recognition apparatus of the feedback type for use in the inventive method of pattern recognition using multiple reference images.

Hereinafter, various embodiments of the invention will be described in conjunction with the drawings. FIG. 1 is a block diagram showing an optical pattern recognition apparatus constructed to effect the inventive method of pattern recognition using multiple reference images. A coherent light source 1, a regulating optical spatial modulator 2, a composite input image generator 3, an object image input unit 10 and a reference image input unit 11 constitute altogether means for converting a composite input image composed of a plurality of reference images and at least one object image into a composite coherent image. A joint Fourier transformer 4 constitutes means for producing a joint Fourier-transformed image of the reference images and the object image. An intensity distribution image generator 5 constitutes means for converting the joint Fourier-transformed image into an intensity distribution image and displaying the same. A second Fourier transformer 6 constitutes means for reading the displayed or recorded intensity distribution image and Fourier-transforming the same into a correlation image. A correlation image detecting unit 7 constitutes means for converting the correlation image into a correlation signal. A correlation coefficient calculating unit 8 constitutes means for processing the correlation signal to determine two-dimensional correlation coefficients between the object image and the respective one of the reference images. A comparator 9 constitutes means for regulating brightness of the displayed respective reference images according to the corresponding correlation coefficients by means of the regulating or masking spatial modulator 2 which can valve or regulate an amount of transmitting light or reflected light locally and gradatively with respect to the individual reference images.

Next, the description is given for the inventive method for operating the FIG. 1 system. In the first step, there are prepared a plurality of initial groups 12 each containing a given number of individual reference images. Then, the pattern recognition of the feedback mode is carried out for the object image with respect to each of the initial groups 12 to discriminate each most-associated reference image having a maximum correlation coefficient in each initial group 12. At first, the coherent composite input image generating unit 3 receives the object image from the object image input unit 10 and one group of the reference images selected from the reference image input unit 11. The composite image of the object and reference images is irradiated by a coherent light from the coherent light source 1 through the masking spatial modulator 2 to produce a composite coherent input image of the object and reference images. At this time, the masking spatial modulator 2 is set with a uniform transmittance or reflectivity so that no masking is effected to the respective reference images.

Next, the composite coherent input image is joint Fourier-transformed by the first Fourier-transform unit 4 comprised of a Fourier transform lens etc., and the resulting joint Fourier-transform image is recorded on the intensity distribution image generating unit 5 composed of an optically writeable spatial modulator, in the form of an intensity distribution image. This intensity distribution image is again Fourier-transformed by the second Fourier-transforming unit 6 composed of a coherent reading light source and a Fourier transform lens to produce a correlation image. This correlation image is detected by the correlation image detecting unit 7 composed of a photodetector to produce a corresponding correlation signal. This correlation signal is analyzed with respect to its intensity peaks by the correlation coefficient calculating unit 8 to determine respective correlation coefficients normalized by the maximum intensity peak value and corresponding to the individual reference images included in the selected group. The calculated correlation coefficients are fed to the comparator 9 for comparison with previously stored correlation coefficients. The comparator 9 is initially set with value "1" for every reference image. If a difference between a newly calculated correlation coefficient and a corresponding previously stored correlation coefficient is greater than a given measurement noise error of the newly calculated correlation coefficient, the previous value of correlation coefficient is updated to the new value in the comparator 9. These updated values of the correlation coefficients are fed back to the masking spatial modulator 2 to drive the same according to the updated values of the correlation coefficients. Namely, the masking spatial modulator 2 regulates an intensity of a coherent light component incident to each reference image so as to gradatively mask the same at a rate that is dependent on the corresponding correlation coefficient. In this state, the optical correlation processing is again carried out to generate a new correlation coefficient for each reference image. Such feedback procedure is repeatedly carried out several times such that all of the differences between the preceding and succeeding correlation coefficients become less than a measurement noise error of the correlation coefficient calculation, to thereby discriminate a certain reference image having a final maximum correlation coefficient. Regardless of the fact that the tested group does not includes a correct reference image corresponding to the object image, a certain reference image most-associated to the object image and having a maximum correlation coefficient is successfully determined during the course of the feedback procedure. The thus determined most-associated reference image is memorized in the reference image input unit 11. Simultaneously, the comparator 9 is reset so that all of the initial correlation coefficients are set to value "1". Further, the masking spatial modulator 2 is also reset or initialized so as to pass a coherent light uniformly everywhere incident to the coherent input image generating unit 3.

Next, another group of reference images are inputted into the coherent input image generating unit 3 from the reference image input unit 11. The above described feedback procedure is again carried out to determine a certain reference image having a maximum correlation coefficient among the reference images contained in the tested group. Such pattern recognition of the feedback mode is sequentially carried our for all of the reference image groups so that a plurality of most-associated reference images are selected from the respective groups one by one and memorized in the reference image input unit 11. The first step is carried out as described above to determine each most-associated reference image having a maximum correlation coefficient value for each of the reference image groups 12.

Next, the description is given for the second step of the inventive method, in which new reference image groups are formed using the selected or memorized reference images having a maximum correlation coefficient. After finishing the first step, all of the most-associated reference images memorized in the input unit 11 are regrouped into new groups each containing a given number of reference images which can be treated concurrently at one operation of the pattern recognition of the feedback mode. Then, the pattern recognition processing is carried out for each of the new groups so as to enable a next regrouping procedure.

In the third step, the regrouping procedure is repeatedly carried out so as to reduce a number of groups. Lastly, when a number of the newest most-associated reference images falls within a predetermined number which can be treated concurrently at one operation of the pattern recognition processing of the feedback mode, there is formed a single final group. The final pattern recognition is effected using this final group to determine a correct reference image exactly corresponding to the object image. In the inventive method, the regrouping is effected at least one time.

Figure 2:
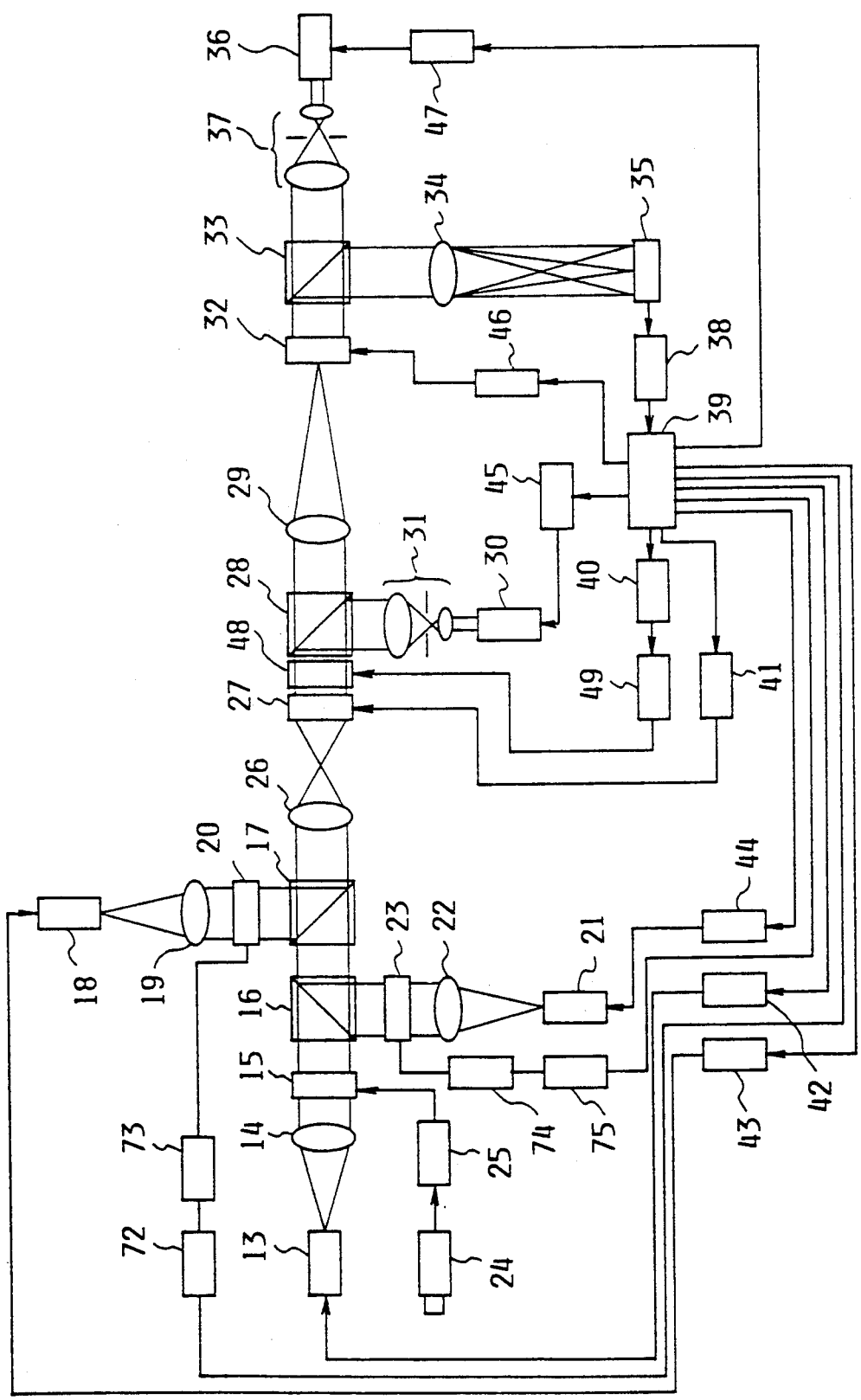
FIG. 2 is a detailed diagram showing one embodiment of the FIG. 1 optical pattern recognition apparatus.

FIG. 2 shows one embodiment of the pattern recognition apparatus, constructed to carry out the inventive method of optical pattern recognition using multiple reference images. The means for generating a composite coherent input image of multiple reference images and single object image is comprised of a first LED 13, first collimating lens 14, first liquid crystal display 15, first beam splitter 16, second beam splitter 17, second LED 18, second collimating lens 19, second liquid crystal display 20, third LED 21, third collimating lens 22, third liquid crystal display 23, first CCD camera 24, first liquid crystal display driver 25, imaging lens 26, first optically writeable liquid crystal light valve 27, first polarization beam splitter 28, first laser source 30, first beam expander 31, first light valve driver 41, first LED driver 42, second LED driver 43, third LED driver 44 and first laser driver 45. A first Fourier transform lens 29 constitutes means for Fourier-transforming the composite coherent input image into a joint Fourier-transformed image of the object image and the multiple reference images. A second optically writeable liquid crystal light valve 32 and a second light valve driver 46 constitute means for converting the joint Fourier-transformed image into an intensity distribution image and for displaying the intensity distribution image. A second polarization beam splitter 33, second laser source 36, second beam expander 37 and second laser driver 47 constitute means for reading out the displayed intensity distribution image using a coherent light. A second Fourier transform lens 34 and a photodiode array 35 constitute means for Fourier-transforming the read intensity distribution image to produce a correlation image and for converting the correlation image into an electric correlation signal. An A/D converter 38 and a computer 39 constitute means for processing the correlation signal to produce two-dimensional correlation coefficients between the single object image and the respective one of the multiple reference images. A first D/A converter 40, a fourth liquid crystal display 48 and a fourth liquid crystal display driver 49 constitute means for gradatively masking each of the reference images according to the corresponding value of the correlation coefficients by regulating or valving light passing through respective reference images. In the above described construction, the first optically writeable liquid crystal light valve 27 is disposed on a front image plane of the first Fourier transform lens 29. The second optically writeable liquid crystal light valve 32 is disposed on a rear image plane of the first Fourier transform lens 29 and incidentally on a front image plane of the second Fourier transform lens 34. The photodiode array 35 is disposed on a rear image plane of the second Fourier transform lens 34.

In operation, at first a condition is set such that the second liquid crystal display 20 and the third liquid crystal display 23 are turned to block an incident light, or the second LED 18 and the third LED 21 are turned off to stop emitting. Then, the first CCD camera 24 inputs an object image in the form of a character pattern or article pattern. The object image is displayed on the first liquid crystal display 15 of the transmission type through the first display driver 25. The first LED 13 emits an incoherent light which is changed to a parallel beam through the first collimating lens 14 and which is then irradiated onto the first liquid crystal display 15 to project an incoherent object image. This incoherent object image passes through the first beam splitter 16 and the second beam splitter 17, and is then focused and recorded on an optical writing surface of the first optically writeable liquid crystal light valve 27 through the imaging lens 26.

On the other hand, the second D/A converter 72 converts a digital image signal indicative of a selected one of the reference image groups stored in a memory of the computer 39, into a corresponding analog image signal. The second liquid crystal display 20 displays the selected group of the reference images through the second liquid crystal display driver 73 according to the analog image signal. Then, the second LED driver 43 operates in response to a write command issued from the computer 39 to drive the second LED 18. Consequently, the second LED 18 emits an incoherent light which is converted into a parallel beam by the second collimating lens 19 and which is then irradiated onto the second liquid crystal display 20 to project incoherent reference images of the displayed group. The incoherent reference images are reflected by the second beam splitter 17, and thereafter are focused on the writing face of the optically writeable liquid crystal light valve 27 by means of the imaging lens 26, and therefore are recorded thereon in superposed relation to the recorded object image.

FIG. 7 shows an example of a composite input image of the object image and the reference images recorded in the optically writeable liquid crystal light valve 27. In FIG. 7, a single alphabetic object image "E" is encircled by a reference image group comprised of 13 alphabetic reference images "O", "E", "R", "M", "W", "Y", "K", "G", "U", "J", "A", "B" and "H". Alternatively, an object image and a reference image group may be concurrently inputted into the first liquid crystal display 15 and the second liquid crystal display 20, respectively, such that the object image and the reference image group are concurrently written into the first optically writeable liquid crystal light valve 27 in the superposed relation.

Returning to FIG. 2, the first laser driver 45 is operated in response to a signal fed from the computer 39 to drive the first laser source 30. The first laser source 30 emits a coherent light which is expanded by the first beam expander 31 so as to irradiate an opposite reading face of the optically writeable light valve 27 through the first polarization beam splitter 28 and the fourth liquid crystal display 48 which functions as a masking modulator to read out the recorded image in the form of a coherent composite image of the object image and the reference image group. In this state, the fourth liquid crystal display 48 of the transmission type has an initially uniform display density so as to irradiate uniformly at least the object and reference image area by the uniform intensity of the coherent light. However, when there is a considerable size difference or mark-to-space ratio difference among the reference images, the fourth liquid crystal display 48 is preferably controlled to set locally its transmittance to regulate locally an irradiation amount of the coherent incident light so as to equalize the contribution of the respective reference images. Such technology is disclosed in the co-pending Japanese Patent Application No. 5241/1990 (and U.S Pat. application Ser. No. 539,725). The fourth masking liquid crystal display 48 may be alternatively disposed between the first polarization beam splitter 28 and the first Fourier transform lens 29 instead of the fourth liquid crystal display 48 being disposed between the first optically writeable liquid crystal light valve 27 and the first polarization beam splitter 28. The thus read coherent composite image of the single object image and the group of reference images is transmitted back through the fourth liquid crystal display 48 and the first polarization beam splitter 28, and thereafter is Fourier-transformed by the first Fourier transform lens 29 to form a joint Fourier-transformed image of the object and reference images on a writing face of the second optically writeable liquid crystal light valve 32. This joint Fourier-transformed image is comprised of an interference fringe generated between the object and reference images. The thus obtained joint Fourier-transformed image is recorded in the second optically writeable liquid crystal light valve 32 in the form of an intensity distribution image.

Next, the computer 39 issues a reading command to the second laser driver 47 to enable the second laser source 36 to emit a coherent light. This coherent light is expanded by the second beam expander 37 so as to irradiate a reading face of the second optically writeable liquid crystal light valve 32 through the second polarization beam splitter 33 to read out the recorded intensity distribution of the joint Fourier-transformed image. The read image is reflected out by the second polarization beam splitter 33, and is thereafter Fourier-transformed by the second Fourier transform lens 34 to form a correlation image on the photodiode array 35. The photodetector array 35 has a photodetecting surface arranged to detect correlation peaks having a sharp and distinct intensity, contained in the correlation image. The thus detected correlation peaks are converted into a corresponding electric signal by the photodiode array 35. This analog signal is converted by the A/D converter 38 into a corresponding digital signal which is fed to the computer 39. The above described joint transform correlator is of a shift-variable system such that positions of the correlation peaks are determined according to the relative positional relationship between the object image and the respective one of the reference images. Therefore, the photodiode array 35 is provided with photodetecting elements which are aligned with expected positions of the correlation peaks. Alternatively, an image detecting device such as a CCD camera may be used as the correlation peak detecting means. In such case, an optical mask should be disposed just in front of the CCD camera so as to selectively pass light components directed to expected positions of correlation peaks.

However, the greater the number of reference images of the selected group written into the first liquid crystal light valve 27 together with the object image, the smaller the visibility of an interference fringe which forms the joint Fourier-transformed image of the object and reference images. Therefore, when the first optically writeable liquid crystal light valve 27 has a relatively small dynamic range for an intensity of the writing light, a carrier wave component of the joint Fourier-transformed image can not be written efficiently so that the above-noted correlation peaks, may contain various noise components to weaken an intensity of self-correlation peaks and to strengthen an intensity of mutual correlation peaks too thereby hinder accurate pattern recognition. In order to solve the above noted drawbacks, the inventors have proposed a joint transform correlator of the feedback operation mode disclosed in the co-pending Japanese Patent Application Nos. 166758/1989, 155224/1989, 247612/1989, 5241/1990 and 5246/1990 (and U.S. Pat. application Ser. Nos. 539,725).

The FIG. 2 embodiment is provided with a similar feedback loop to which the following description is directed. Generally, the correlation signal fed to the computer 39 contains a plurality of correlation peaks corresponding to respective reference images contained in the selected reference image group. The computer 39 normalizes the respective correlation peak values by the maximum value of the most intensive correlation peak to produce relative correlation peak intensity values which are identical to the normalized correlation coefficients described in conjunction with FIG. 1. The thus calculated relative correlation peak values corresponding to the respective ones of the reference images are converted into digital driving signals of the fourth masking liquid crystal display 48 through a given feedback transfer function. These digital driving signals are fed to the first D/A converter 40.

Figure 8:
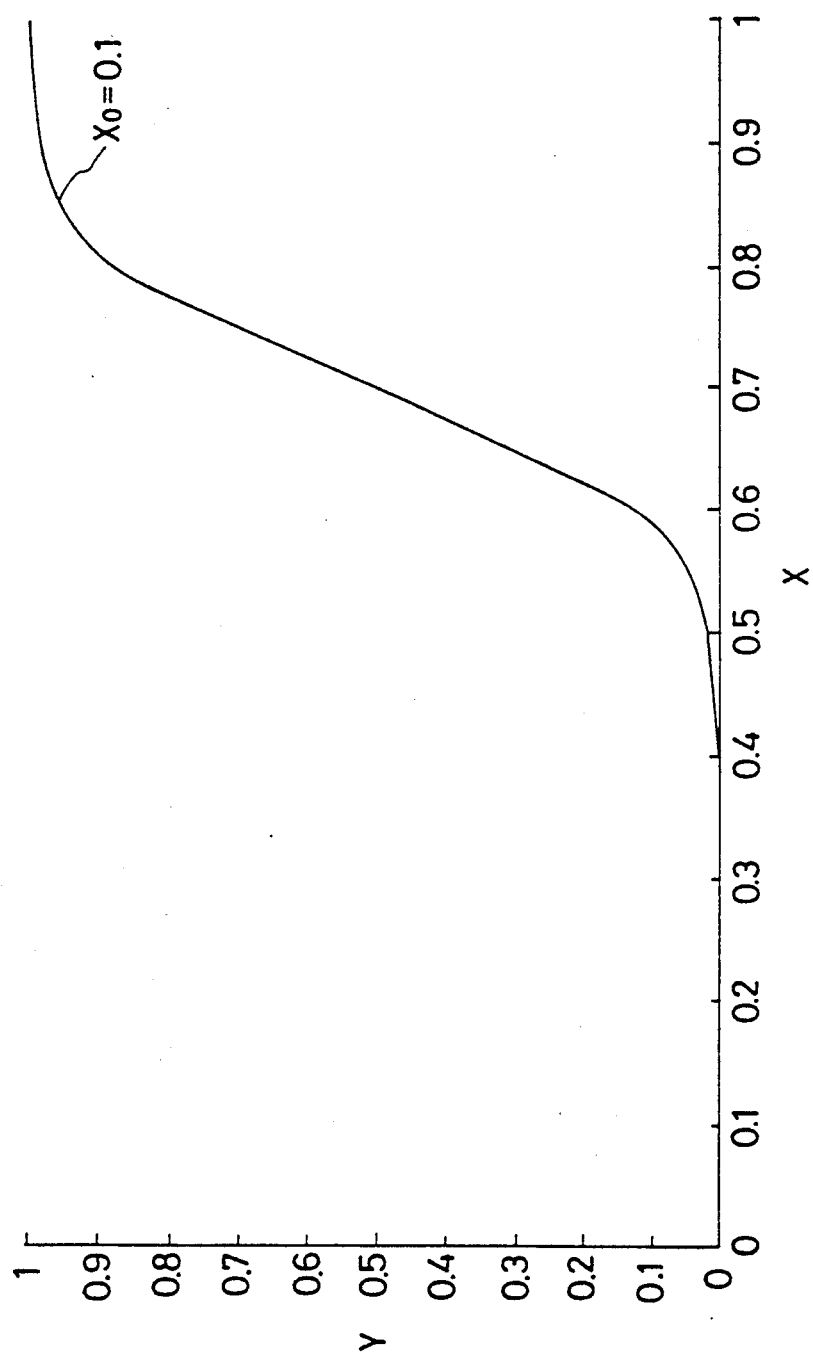
FIG. 8 is a diagram showing an example of a feedback transfer function used in the FIG. 2 embodiment.

The feedback transfer function is utilized to generate liquid crystal display driving signals corresponding to the relative correlation peak values. FIG. 8 shows an example of a nonlinear feedback transfer function. FIG. 8 indicates a sigmoid function in the form of $Y=(\frac{1}{2})[1+\tanh(X-a)/b]$. In this form, Y denotes a local transmittance of the fourth masking liquid crystal display 48, X denotes a relative correlation peak value or a compensated relative correlation peak value which is multiplied by a given rate determined to level an incident light amount to the individual reference images to compensate for a difference in size or mark-to-space ratio of the individual reference images. The parameter b determines nonlinearity of the sigmoid function, and the other parameter a determines a threshold value of the sigmoid function. FIG. 8 indicates an example where $a=0.7$ and $b=0.1$. It has been found that the use of nonlinear feedback transfer function improve the image recognition performance as described in the co-pending Japanese Patent Application No. 5246/1990 (and U.S. Pat. application Ser. No. 539,725).

Returning to FIG. 2, the digital driving signal formed through the feedback transfer function is converted into an analog signal such as a video signal by the first D/A converter 40. The analog signal is fed to the driver 49 to drive the fourth masking liquid crystal display 48. By such operation, the fourth liquid crystal display 48 gradatively masks the coherent light from the first laser source 30 according to the relative correlation peak values so as to regulate irradiation amount of the coherent light onto the respective reference images. In the FIG. 2 embodiment, the reading light passes twice the fourth liquid crystal display 48 forwardly and reversely so as to read out the recorded image on the first liquid crystal light valve 27, hence the fourth liquid crystal display 48 is set with a positive root value of the actual transmittance Y. After relatively masking the respective reference images, the joint transform correlation is effected for the object images and the gradatively masked reference images. Then, the feedback operation is again carried out. After repeatedly carrying out the joint transform correlation operation and the feedback operation, there can be effected a desired image recognition.

Figure 9:
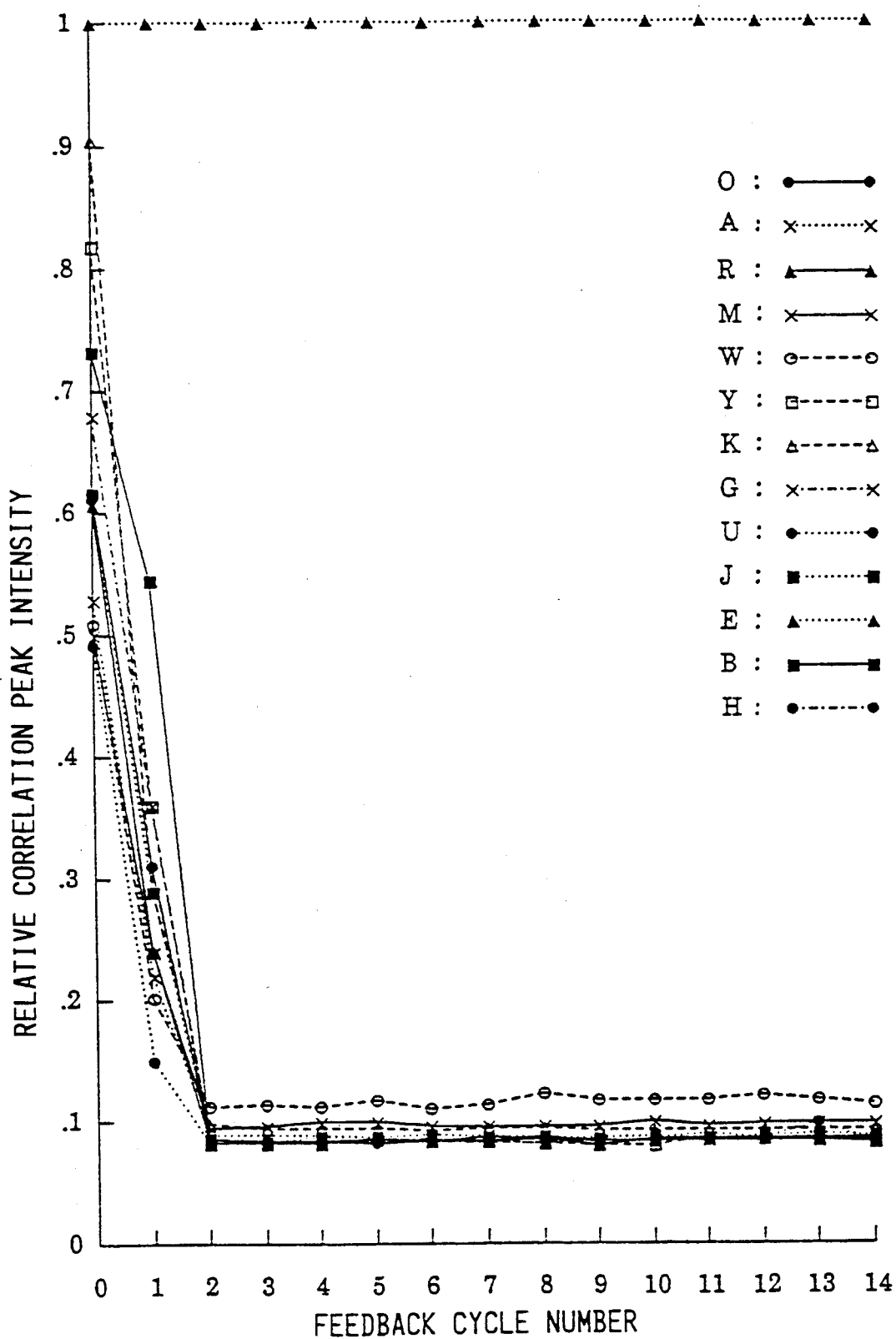
FIG. 9 is a graph showing the relation between the feedback cycle number and the correlation peak intensity rate according to the invention.

FIG. 9 is a graph showing the change of the relative correlation peak values in terms of feedback cycle number, measured using the FIG. 7 composite input image of the object and reference images, which is recorded in the first optically writeable liquid crystal light valve of the FIG. 2 embodiment. As seen from FIG. 9, in the joint transform correlator having the feedback system, feedback operation is repeatedly effected several times to thereby correctly recognize the object image. However, the joint transform correlator of the feedback operation mode cannot execute correct pattern recognition if a large scale reference group is used containing an excess number of reference images, e.g., a complete set of 26 alphabets. On the other hand, the complete set of alphabets may be divided into two groups each containing 13 characters, and the recognition processing may be carried out twice for the two groups. In such case, the joint transform correlator operates to select a most-associate reference image from each group even if the tested group does not contains a correct reference image corresponding to the object image. For example, if the FIG. 2 embodiment of the feedback mode effects image recognition for a composite input image composed of the same object image "E" and the other group containing 13 number of reference images "C", "D", "F", "I", "L", "N", "P", "Q", "S", "T", "V", "X" and "Z" instead of the FIG. 7 input image, the reference image "F" may be incorrectly recognized as the object image "E". In view of this, according to the invention, a new group is formed of the one most-associated reference image "E" selected from the one group and the other most-associated reference image "F" selected from the remaining group. Then, the FIG. 2 joint transform correlator carries out the pattern recognition through the feedback loop for a composite input image of the object image "E" and the new reference group of "E" and "F" to thereby correctly recognize the object image "E". By such operation, any alphabet character can be correctly recognized with reference to the complete set of 26 alphabets.

Returning to FIG. 2, the above noted inventive method will be described in conjunction with the embodiment of the joint transform correlator. As described before, when the composite input image shown in FIG. 7 is treated by the FIG. 2 joint transform correlator, there can be discriminated a most-associated reference image "E". This discriminated reference image "E" is memorized in a memory of the computer 39. The fact that the discrimination procedure is finished is judged when variation of the sum of the relative correlation peak values becomes less than a given level and concurrently the difference between the maximum relative correlation peak value and the second-maximum relative correlation peak value becomes more than a given value.

Next, the previous input image is erased from the first optically writeable liquid crystal light valve 27. Then, the second liquid crystal display 20 and the third liquid crystal display 23 are turned to an optically nontransmissive state, or the second LED 18 and the third LED 21 are placed in the nonemitive state. Meanwhile, the object image inputted from the first CCD camera 24 is still displayed on the first liquid crystal display 15 through the first display driver 25. The first LED 13 emits the incoherent light which is converted into a parallel beam by the first collimating lens 14 so as to convert the object image displayed on the first liquid crystal display 15 into an incoherent image. This incoherent image is transmitted through the first beam splitter 16 and the second-beam splitter 17, and is then focused and recorded on the writing face of the first optically writeable liquid crystal light valve 27 by means of the imaging lens 26.

Next, another reference image group which is not yet tested is retrieved from the memory of the computer 39 in the form of a digital image signal. The third D/A converter 75 converts the digital image signal into a corresponding analog image signal. The third liquid crystal display driver 74 operates according to the analog image signal to display the retrieved reference image group on the third liquid crystal display 23. Then the third LED driver 44 operates in response to a write command issued from the computer 39 to enable the third LED 21 to emit an incoherent light. This incoherent light is converted into a parallel beam by the third collimating lens 22 so as to irradiate the reference image group displayed on the third liquid crystal display 23 to convert the same into an incoherent image. This incoherent image is reflected by the first beam splitter 16 and is then transmitted through the second beam splitter 17, so that the reference image group is focused on the writing face of the first optically writeable liquid crystal light valve 27 by the imaging lens 26 and is recorded in the superposed relation to the recorded object image. In this embodiment, this second composite input image is composed of the object image E encircled by the reference image group composed of reference images "C", "D", "F", "I", "L", "N", "P", "Q", "S", "T", "V", "X" and "Z" in manner similar to the FIG. 7 composite input image. Otherwise, the object image and the reference image group may be concurrently inputted into the first liquid crystal display 15 and the third liquid crystal display 23, respectively, and these object and reference images may be concurrently recorded on the first optically writeable liquid crystal light valve 27 in the superposed relation.

Then, the image recognition procedure is effected in the joint transform correlator of the feedback operation type for the composite input image of the object and reference images recorded on the first optically writeable liquid crystal light valve 27, thereby discriminating the reference image "F" as being most-associated to the object image. Consequently, the reference image "F" is memorized in the memory of the computer 39. By such operation, the give object image of alphabet has been tested for all of the alphabet reference images. Therefore, a new reference group is formed of the reference images "E" and "F" memorized in the buffer memory of the computer 39. This new group data is converted into an analog signal by the second D/A converter 72. The second liquid crystal display driver 73 operates according to the analog signal to display the new group on the second liquid crystal display 20. Thereafter, in a manner similar to the above described procedure, the object image and the new group of the reference images are written in the first optically writeable liquid crystal light valve 27 to form a final composite input image. This final composite input image is subject to the image recognition procedure by the joint transform correlator having the feedback system to thereby finally discriminate the correct reference image "E" identical to the object image.

In the above described example, the complete set is comprised of 26 reference images, hence there is formed only one new reference image group by a single regrouping procedure. However, when OCR character recognition is being performed a greater set of reference images is used up to, for example 170 characters including alphabets, katakanas (Japanese alphabets), numerals, various punctuation marks and algebraic symbols. In such a case, if the joint transform correlator of the feedback type has a capacity effective to process concurrently at most 10 reference images in one group, there may be prepared 17 initial groups of reference images in order to recognize a particular object image involved in the complete set. Firstly, the image recognition is carried out for each of the 17 groups to discriminate 17 most-associated reference images from each group. These 17 most-associated reference images are regrouped into two new groups. Then, the two new groups are subjected to the image recognition procedure to discriminate two most-associated reference images for each of the two new groups. Again, the two most-associated reference images are regrouped into a single final group. Lastly, the same image recognition processing is effected using the final reference image group to thereby discriminate a final reference image correctly corresponding to the object image. Such regrouping procedure may be applied to treat a general pattern image besides the character image.

Figure 11:
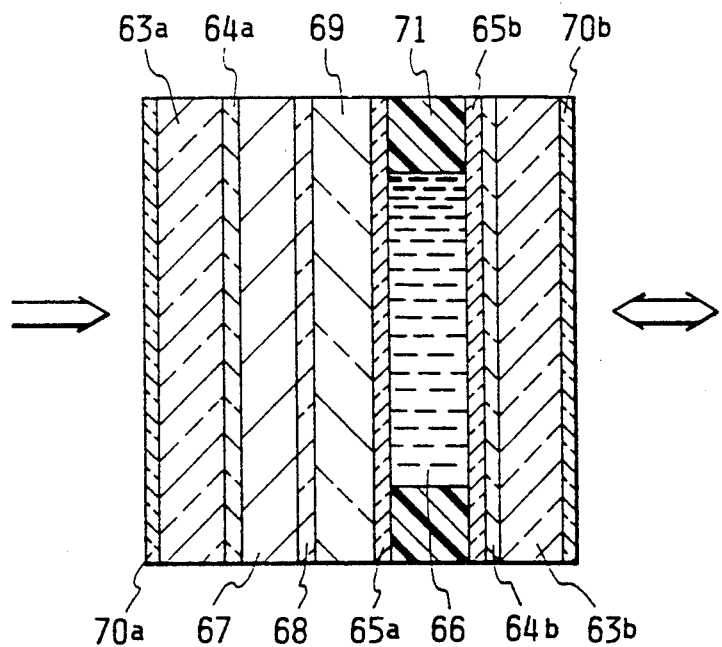
FIG. 11 is a sectional view of an example of an optically writeable liquid crystal light valve used in the invention.

As understood from the above description, the greater the number of reference images involved in a base set of the image recognition, the greater the number of newly formed groups. Accordingly, total the cycle number of the feedback operation is increased to thereby prolong a total processing time needed to discriminate a final correct reference image. In order to avoid such a problem, it is advisable to use a high speed operation type of the first optically writeable liquid crystal light valve 27 and the second optically writeable liquid crystal light valve 32. FIG. 11 is a sectional diagram showing such a type of the optically writeable liquid crystal light valve used in the FIG. 2 embodiment. The light valve is comprised of a pair of transparent substrates 63a and 63b composed of glass or plastics for sandwiching a liquid crystal layer. These substrates 63a, 63b are formed sequentially with transparent electrode layers 64a, 64b and alignment film layers 65a, 65b which are formed by oblique evaporation of silicon monotide in an angle range from 75° to 85° relative to the normal of the transparent substrate. The pair of transparent substrates 63a and 63b are spaced a given distance from each other through a spacer 71 with their alignment film layers 65a and 65b facing each other for sandwiching therebetween the ferroelectric liquid crystal layer 66. The transparent electrode 64a defines an optically writing face on which is formed with a laminated structure of a photoconductive layer 67, a light shielding layer 68 and a dielectric mirror 69 which is covered by the alignment layer 65a. Anti-reflective coatings 70a and 70b are formed, respectively, on outer surfaces of the writing side transparent substrate 63a Next, the description is given for initializing operation of the above constructed cell which can be used as the optically writeable liquid crystal light valves 27 or 32 in the FIG. 2 embodiment. According to one method, the entire writing face of the light valve is irradiated uniformly by an incident light, while the pair of transparent electrode layers 64a and 64b are supplied therebetween with a DC bias voltage optionally superposed with an AC voltage of 100 Hz-50 KHz, and having a magnitude sufficiently greater than a given threshold voltage determined under the bright condition. By such operation the ferroelectric liquid crystal molecules are aligned in one of the bi-stable states, and this state is memorized to initialize the liquid crystal cell. According to another method, the pair of transparent electrode layers 64a and 64b are supplied therebetween with a DC bias voltage optionally superposed with an AC voltage of 100 Hz-50 KHz having a magnitude much greater than another threshold voltage determined under the dark condition so as to align the ferroelectric liquid crystal molecules in one of the bi-stable states to thereby initialize the liquid crystal cell.

Next, the description is given for the writing and reading operation of the light valve after the initialization. While applying across the pair of transparent electrode layers 64a and 64b a given DC bias voltage of the opposite polarity optionally being superposed with an AC voltage and having a magnitude smaller than an operating threshold voltage defined under the dark condition and greater than another threshold voltage defined under the bright condition, an incoherent or coherent light is irradiated selectively to write an image. Carrier is generated in an irradiated region of the photoconductive layer 67 so that the generated carrier drifts in the electric field direction of the DC bias voltage to reduce an effective operating threshold voltage. Accordingly, the irradiated region is supplied with the opposite polarity of the bias voltage greater than the effective threshold voltage to reverse the ferroelectric liquid crystal molecules due to inversion of their spontaneous dipole moment to switch to the other of the bi-stable states. Thus, the input image is recorded in the binarized form. The binarized image can be read out in the positive or negative form by irradiating a linearly polarized reading light having a polarization axis parallel or perpendicular to the alignment direction of the initialized liquid crystal molecules, through an analyzer having a polarization axis perpendicular or parallel to that of a reflected light from the dielectric mirror 69. In the FIG. 2 embodiment, the polarization beam splitters 28 and 33 are utilized as the analyzer. When finalizing an image, the threshold voltage is adjusted by regulating a frequency of the AC voltage or level of the DC bias voltage applied across the pair of transparent electrode layers 64a and 64b. Alternatively, the laser power may be regulated to vary the intensity of the Fourier-transformed image to adjust the effective threshold voltage.

In the above described embodiment, if the dielectric mirror 69 has a sufficient reflectivity for the visible light so that the reading light substantially does not affect the performance of photoconductive layer 67, the shielding layer 68 might be eliminated. Further, if the photoconductive layer 67 has a sufficient reflectivity for the reading light and therefore the reading light does not affect substantially the performance of photoconductive layer 67, the dielectric mirror 69 may be eliminated also.

The above described optically writeable liquid crystal light valve has a very short writing time of an image in the order of several tens $\mu$sec to several hundreds $\mu$sec to enable quite fast recording of the image. This speed is one-several hundreds or one-thousandth of that of the conventional optically writeable liquid crystal light valve using the TN liquid crystal cell. Even though using such high speed liquid crystal light valve, the operating speed of the inventive optical pattern recognition apparatus using multiple reference images is limited actually by an operating speed of the liquid crystal displays 15, 20 and 23 used for inputting the object and reference images. The typical commercial liquid crystal display cell is driven at a frame rate of 30 Hz. Particularly in the liquid crystal display cell of the simple matrix type, it takes more than 16 msec to continuously irradiate a writing light onto the first optically writeable liquid crystal light valve in order to stably write therein the object and reference images from the liquid crystal displays. In order to increase the operating speed, there are utilized two of the second liquid crystal display 20 and the third liquid crystal display 23 for inputting the reference image groups in the FIG. 2 embodiment. However, the writing of object and reference images may be effected by other image input devices such as an electrically addressable spatial modulator using an optical modulation material of the magneto-optic effect such as yttrium-iron-garnet or gadolinium-iron-garnet, or a liquid crystal spatial modulator using ferroelectric liquid crystal to enable fast image input. In such a case, a single image input device may be used for inputting a reference image group.

Figure 3:
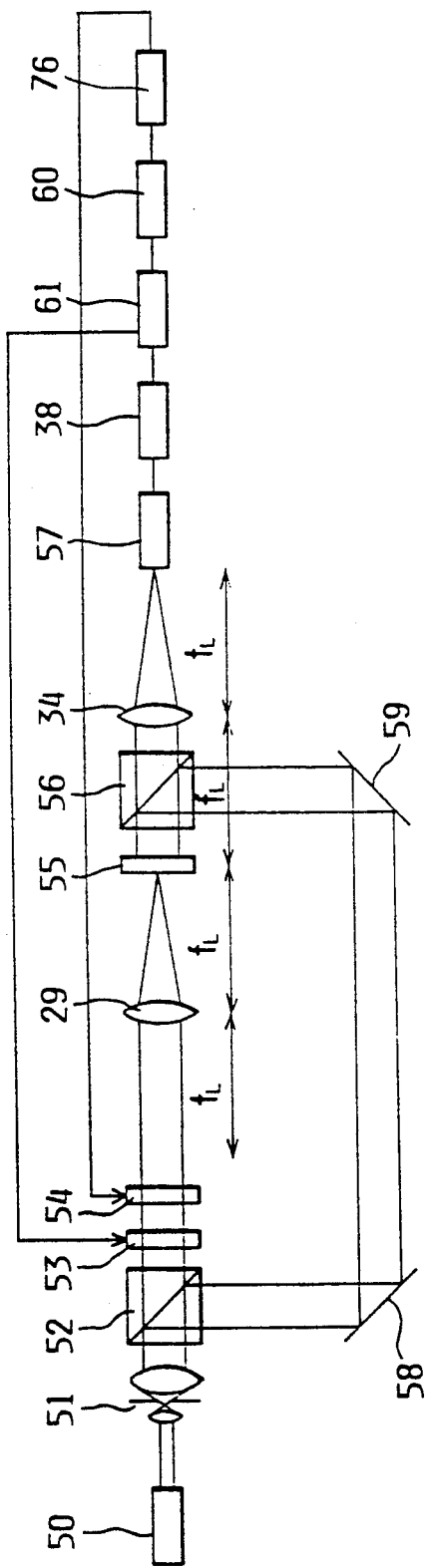
FIG. 3 is a detailed diagram showing another embodiment of the FIG. 1 optical pattern recognition apparatus.
Figure 4:
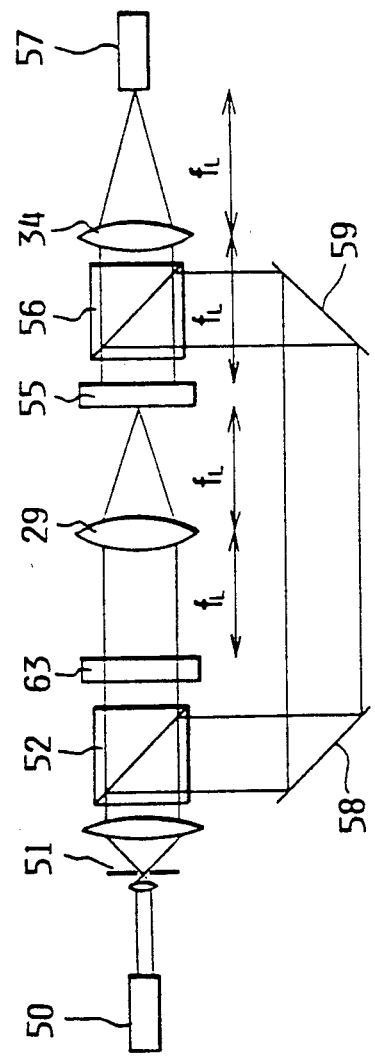
FIG. 4 is a schematic diagram showing an example of the conventional joint transform correlator.

An object image is externally inputted in the FIG. 2 embodiment. However, the inventive pattern recognition apparatus using multiple reference images may be applied to recognize an object image provisionally stored in the computer. FIG. 3 shows a second embodiment of the inventive optical pattern recognition apparatus of such type. The apparatus is comprised of a laser source 50, beam expander 51, beam splitter 52, light shutter 53, liquid crystal display 54, optically writeable liquid crystal light valve 55, polarization beam splitter 56, CCD camera 57, first mirror 58, second mirror 59, D/A converter 60, computer 61 and liquid crystal display controller 76. This embodiment is different from the FIG. 2 embodiment in that the single liquid crystal display 54 is used to input object and reference images and that the object image is provisionally stored in the computer 61 instead of using an externally provided object image. The laser source 50 emits a coherent light which is expanded in a given diameter parallel beam and is then divided into two beams by the beam splitter 52. One of the divided beams passes through the beam splitter 52 and reaches the light shutter 53. When the light shutter 53 is held in the transmissive state, the beam passing through the beam splitter 52 further reaches the liquid crystal display 54. This display 54 displays a composite input image of an object image and a reference image group as shown in FIG. 7. In this case, each of the reference images is gray-scaled according to an input normalization coefficient in order to equalize a light amount transmitting each reference image. The beam which reaches the liquid crystal display 54 converts the composite input image into a coherent image. The coherent image is Fourier-transformed by the first Fourier transform lens 29 to form a joint Fourier-transformed image on a writing face of the optically writeable liquid crystal light valve 55. This light valve 55 may be composed of a liquid cell using an optical modulation material of ferroelectric liquid crystal as shown in FIG. 11 so as to record a binarized joint Fourier-transformed image on the light valve 55.

On the other hand, the remaining beam reflected out by the beam splitter 52 is successively reflected by the first mirror 58, second mirror 59 and polarization beam splitter 56, and is thereafter irradiated on the reading face of the liquid crystal light valve 55 to read out an intensity distribution of the joint Fourier-transformed image to form a coherent joint Fourier-transformed image. In this state, the light shutter 53 may be preferably closed to block incident light. However, as disclosed in the co-pending Japanese Patent Application No. 5247/1990, if the dielectric mirror 69 used in the FIG. 11 optically writeable liquid crystal light valve has a certain reflectivity and the reading light of the intensity distribution of the joint Fourier-transformed image is utilized also as an initializing light of the liquid crystal light valve in the FIG. 3 embodiment, the light shutter 53 may be eliminated. The coherent joint Fourier-transformed image is passed through the polarization beam splitter 56 and is then Fourier-transformed by the second Fourier transform lens 34 to form a correlation image on a photodetecting surface of the CCD camera 57. The correlation image is converted into an electric signal, which is then converted into a digital signal by the A/D converter 38. The computer 61 receives the correlation signal to measure values of correlation peaks so that the correlation peaks are normalized according to the maximum peak value to calculate relative correlation peak values. Further, the input variable X of the feedback transfer function shown in FIG. 8 is set with each product of the relative correlation peak values and the corresponding input normalization coefficients. The output value Y of the transfer function is fed through the D/A converter 60 to the display driver 76. Accordingly, the output values of the fed back transfer function is feedback to vary the gray-scale of the respective reference images in the tested group displayed on the liquid crystal display 54. Instead of the CCD camera 57,, the FIG. 3 apparatus may utilize a plurality of photodetectors positioned in registration with the correlation peaks or a photodetecting array. Such feedback operation is repeatedly carried out several times to discriminate a most-associated reference image relative to the object image in a manner similar to the FIG. 2 embodiment.

Similar to the FIG. 2 embodiment, a plurality of most-associated or most-correlated reference images are discriminated for each of the plural reference image groups. The most-associated reference images are regrouped into new groups. Finally, the correct reference image is identified among all of the reference images involved in the initial groups by repeatedly effecting the regrouping to reduce a number of the reference groups to a final single one. The FIG. 3 embodiment has a simplified construction, as compared to the FIG. 2 embodiment, to constitute an optical pattern recognition apparatus of the multiple reference images, but its recognition speed is limited by the operating speed of the liquid crystal display 54.

Figure 10:
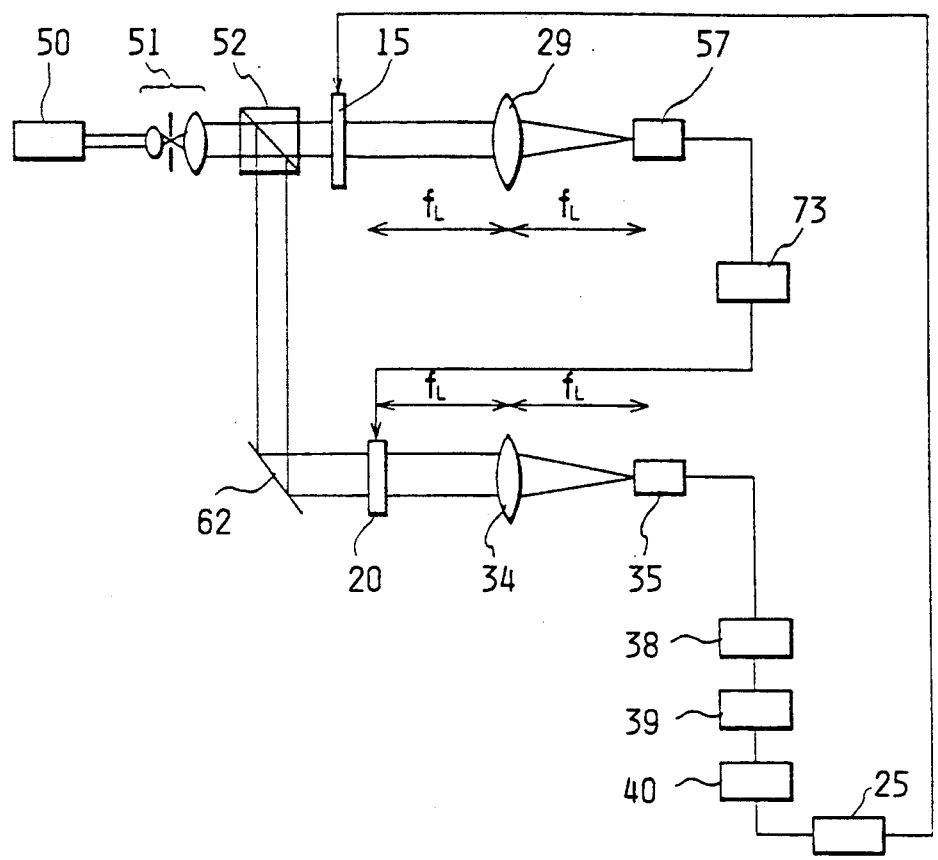
FIG. 10 is a detailed diagram showing still another embodiment of the optical pattern recognition apparatus constructed to carry out the inventive method of pattern recognition using multiple reference images.

FIG. 10 shows the third embodiment of the inventive optical pattern recognition apparatus of the multiple reference image type, utilizing electrically writeable optical spatial modulators. The FIG. 10 embodiment is provided with a mirror 62. A CCD camera 57 and a second liquid crystal display 20 constitute means for converting a joint Fourier-transform image into an intensity distribution image and for displaying the same. Namely, the intensity distribution of the joint Fourier-transform image of the composite input image displayed on a first liquid crystal display 15 is converted by the CCD camera 57 into an intensity distribution signal of the joint Fourier-transformed image. This signal is fed through a second display driver 73 to the second liquid crystal display 20 to display the intensity distribution of the joint Fourier-transformed image. A beam divided out by a beam splitter 52 is reflected by the mirror 62 so as to irradiate the second liquid crystal display 20 to thereby convert the intensity distribution of the joint Fourier-transformed image into a coherent image. This coherent image is again Fourier-transformed by a second Fourier transform lens 34 to produce correlation peaks, which are detected by a photodiode array 35 to produce a corresponding electric signal. This electric signal is processed in manner similar to the previous embodiment.

The joint Fourier-transformed intensity distribution image is displayed by the second liquid crystal display 20 in the FIG. 10 embodiment. However, this intensity distribution image may be recorded on an optically writeable spatial modulator using a scanning optical system such as a laser scanner. The beam splitter 52 is utilized to divide a laser beam from the laser source 50 into two beams in the embodiments. However, a pair of laser units may be used instead of the beam splitter.

As described above, according to the inventive optical pattern recognition method of the multi-reference image type, the pattern recognition is executed with respect to over a great number of reference images from 26 to one hundred, thereby advantageously carrying out the pattern recognition of characters etc. which requires a great number of references at a high speed. Further, the inventive method can be effectively applied to a machine vision system involving a vast number of parts, and a finger print search system.

What is claimed is:

1. A pattern recognition method for an optical pattern recognition apparatus which is comprised of means for converting a composite input image composed of a group of reference images and at lest one object image into a composite coherent image, means for Fourier-transforming the composite coherent image, means for Fourier-transforming the composite coherent image to produce a joint Fourier-transformed image of the reference images and the object image, means including an optical spatial modulator for recording an optical intensity distribution of the joint Fourier-transformed image on the optical spatial modulator, means for reading the recorded optical intensity distribution with a coherent light to reproduce a corresponding coherent image, means for Fourier-transforming the reproduced coherent image to produce a correlation image. means including a photodetector for detecting the correlation image to produce a corresponding correlation signal, means for processing the correlated signal to determine two-dimensional correlation coefficients between the object image and each respective one of the reference images, and means including a regulating spatial modulator disposed in an optical path extending through the reference images for regulating brightness of each respective one of the reference images according to the corresponding correlation coefficients so as to discriminate a most-associated reference image relative to the object image to thereby effect pattern recognition of the object image, the pattern recognition method comprising the steps of: preparing a plurality of initial groups each containing a given number of individual reference images and carrying out the pattern recognition of the object image with respect to each of the initial groups to discriminate each of the most-associated reference images having a maximum correlation coefficient in each initial group; regrouping all of the discriminated most-associated reference images into new groups the number of which is less tan that of the initial groups, and again carrying out the pattern recognition of the object image with respect to the new groups so as to enable a next regrouping; and repeatedly carrying out the regrouping so as to reduce the number of the groups to thereby form a final group and carrying out the pattern recognition of the object image using the final group of the reference images to thereby determine a particular reference image corresponding to the object image.

2. A pattern recognition method according to claim 1; wherein each respective one of the most-associated reference images is discriminated in a reference image group by regulating a brightness of each one of the respective reference images in a nonlinear relationship relative to their corresponding detected correlation coefficients.

3. A pattern recognition method according to claim 1; wherein the pattern recognition of the object image is effected based on a binarized joint Fourier-transformed image which is binarized in the optical spatial modulator.

4. A pattern recognition method according to claim 1; wherein the respective reference images are variably gray-scaled in a predetermined manner so as to equalize their contribution in the joint Fourier-transformed image.

5. A pattern recognition method for use with an optical pattern recognition apparatus, comprising the steps of: providing a plurality of initial groups of individual reference images; performing pattern recognition of an object image with respect to the individual reference images of each respective initial group so as to determine a most-associated reference image for each initial group, wherein the most-associated reference image of each initial group has a maximum correlation with the object image; forming a plurality of new groups of individual reference images from eh most-associated reference images, wherein the number of new groups is less than the number of initial groups; performing pattern recognition of the object image with respect to the individual reference images of each respective new group so as to determine a most-associated reference image for each new group; repeatedly forming a plurality of new groups of individual reference images from the previously determined most-associated reference images, wherein the number of each successive new groups is less than the number of each previous new groups so as to reduce the number of new groups to form a final group of individual reference images; and carrying out pattern recognition of the object image using the final group to thereby determine a particular reference image corresponding to the object image.

6. A pattern recognition method according to claim 5; wherein each most-associated reference image is determined by regulating a brightness of each individual reference image in a nonlinear relationship relative to their corresponding correlation with the object image.

7. A pattern recognition method according to claim 5; wherein the optical pattern recognition apparatus includes an optical spatial modulator; and the pattern recognition of the object image is effected based on a binarized joint Fourier-transformed image which is binarized in the optical spatial modulator.

8. A pattern recognition method according to claim 5; wherein the optical pattern recognition apparatus includes means for forming a joint Fourier-transformed image of the object image and the individual reference images; and each individual reference image is variably grad-scaled in a predetermined manner so as to equalize their contribution to the joint Fourier-transformed image.

* * * * *